United States Patent
Berenbaum

(10) Patent No.: US 8,122,205 B2
(45) Date of Patent: Feb. 21, 2012

(54) STRUCTURED VIRTUAL REGISTERS FOR EMBEDDED CONTROLLER DEVICES

(75) Inventor: Alan D. Berenbaum, New York, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 421 days.

(21) Appl. No.: 12/389,791

(22) Filed: Feb. 20, 2009

(65) Prior Publication Data

US 2010/0217957 A1    Aug. 26, 2010

(51) Int. Cl.
*G06F 12/00* (2006.01)
(52) U.S. Cl. .................. 711/154; 711/E12.069
(58) Field of Classification Search .............. 711/154
See application file for complete search history.

(56) References Cited

U.S. PATENT DOCUMENTS

| | | | |
|---|---|---|---|
| 5,920,881 A | 7/1999 | Porterfield | |
| 7,076,708 B2 | 7/2006 | Faust et al. | |
| 7,210,026 B2 | 4/2007 | Damron | |
| 7,945,721 B1 * | 5/2011 | Johnsen et al. | 710/311 |
| 2006/0253659 A1 | 11/2006 | Greenfield et al. | |
| 2008/0270736 A1 | 10/2008 | Nishida et al. | |
| 2009/0002227 A1 * | 1/2009 | Jia et al. | 342/357.06 |

* cited by examiner

*Primary Examiner* — Reginald Bragdon
*Assistant Examiner* — Hamdy S Ahmed
(74) *Attorney, Agent, or Firm* — Meyertons Hood Kivlin Kowert & Goetzel, P.C.; Jeffrey C. Hood; Alex A. Courtade

(57) ABSTRACT

Techniques for using structured virtual registers in embedded systems are described. A virtual register structure definition provides a map of virtual registers within an embedded controller. The virtual registers are externally accessible and correspond to memory locations within the embedded controller. In various embodiments, an embedded controller and/or an external entity may store data in or read data from the virtual registers using the virtual register structure definition. The problems of manual tracking of virtual register addresses and manual transcription of virtual register addresses to program code are ameliorated. When the virtual register map changes, logical references in program code to particular virtual registers need not necessarily be changed.

14 Claims, 5 Drawing Sheets

*110*

| Structure Name | Field | Offset | Size (B) |
|---|---|---|---|
| FAN CONTROL | | | |
| (16B/FAN) | Status | 0h | 2 |
| | Enable | 2h | 2 |
| | Configuration | 4h | 2 |
| | Duty Ramp | 6h | 2 |
| | Association | 8h | 4 |
| | Min_Max | Ch | 2 |
| | Scaling factor | Eh | 2 |

*FIG. 1B*

```
struct Fan_Control {
    short    Status;
    short    Enable;
    short    Configuration;
    short    Duty_Ramp;
    long     Association;
    short    Min_Max;
    short    Scaling_factor;
};
```
← 120

```
struct Virtual_Register_Map {
    struct    Status;
    struct    Sensor[8];
    struct    Fan_Control[3];
};
```

*FIG. 1D*

STRUCTURED VIRTUAL REGISTERS FOR EMBEDDED CONTROLLER DEVICES

FIELD OF THE INVENTION

This disclosure generally relates to the use of virtual registers within embedded systems.

DESCRIPTION OF THE RELATED ART

An embedded controller may contain registers. One function of these registers may be to allow data to be exchanged between the embedded controller and an external entity, such as an external host processor.

Registers may be physical hardware registers in the embedded controller. The number of physical hardware registers may be limited by the hardware architecture of the embedded controller. Adding physical hardware registers necessarily requires changing a hardware design. Another type of register is the virtual register. Virtual registers are implemented in memory of the embedded controller and simulate a real physical hardware register.

A problem that arises in using virtual registers within an embedded controller is that it may be difficult to ascertain where in memory a virtual register resides. Making this determination manually can be a tedious and error-prone task. When an author of a computer program has to make numerous manual determinations in program source code, the difficulty is compounded.

SUMMARY OF THE INVENTION

Techniques for using structured virtual registers in the context of embedded systems are described herein.

In some embodiments, an embedded controller includes a plurality of virtual registers corresponding to one or more externally accessible locations within the memory of the embedded controller. The embedded controller also includes a virtual register structure definition which enables reading data from or storing data in these virtual registers. The externally accessible locations may be accessed via a bus connected to the embedded controller, or through other means. In some embodiments, the embedded controller may selectively delay or deny external access to its virtual registers. The embedded controller may acquire data from sensors and/or devices and make this data available via its virtual registers. The virtual register structure definition provides an improved method for allocating, maintaining, and updating the set of virtual registers.

A host system may be coupled to the embedded controller through one or more buses and may be operable to access the virtual registers. The host system may be capable of using the virtual register structure definition to read data from or store data in the plurality of virtual registers in the memory of the embedded controller. The host system may store a local copy of the virtual register structure definition that is present at the embedded controller, and may use this local copy to facilitate access to the virtual registers in the embedded controller.

In another embodiment, a computer system contains an embedded controller and a host system. The embedded controller is capable of using stored instructions and a virtual register structure definition to read data from or store data in the plurality of virtual registers corresponding to one or more externally accessible locations within the memory of the embedded controller. The host system is capable of using stored instructions and the virtual register structure definition (or a copy thereof) to read data from or store data in the plurality of virtual registers. External access by the host system may be provided via one or more busses. In some embodiments, the embedded controller may selectively delay or deny external access to the virtual registers. The embedded controller may acquire data from sensors and/or devices. In all of the above embodiments, direct memory access (DMA) may be utilized for external access.

BRIEF DESCRIPTION OF THE DRAWINGS

FIG. 1B is a depiction of an example definition of a structure for a fan control.

FIG. 1C shows a C code sample representing the structure of FIG. 1B.

FIG. 1D shows a C code sample representing a virtual register map layout.

DETAILED DESCRIPTION OF THE INVENTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Computer System." This term has its ordinary and accepted meaning in the art, and includes one or more computing devices capable of intercommunication, e.g., a host system and an embedded processor. "Computer system" includes any computer instructions stored on the computing devices. A computing device includes at least one or more processing units and a memory subsystem. A memory subsystem may store program instructions executable by the one or more processing units.

"Processor." This term includes any circuitry that is configured to execute program instructions (e.g., a central processing unit (CPU)). As used herein, a "processor" may refer to a computer subsystem having one or more processors. A processor may have one or more processing "cores" on a single die. A processor may be distributed across multiple dies.

"Configured." As used herein, this term means that a particular piece of hardware or software is arranged to perform a particular task or tasks when operated. Thus, a computer system that is "configured to" perform task A means that the computer system includes a circuit, program instructions stored in memory, or other structure that, during operation of the computer system, performs or can be used to perform task A. (As such, a computer system can be "configured to" perform task A even if the computer system is not currently powered on.) Similarly, a computer program that is "configured to" perform task B includes instructions, that if executed by a computer system, perform task B.

A "memory address range," as used herein, refers to a contiguous series of one or more logically connected bytes in a memory address space.

"Direct memory access," as used herein has the full breadth of its ordinary meaning in the field of embedded computing technology.

Figure 1A:
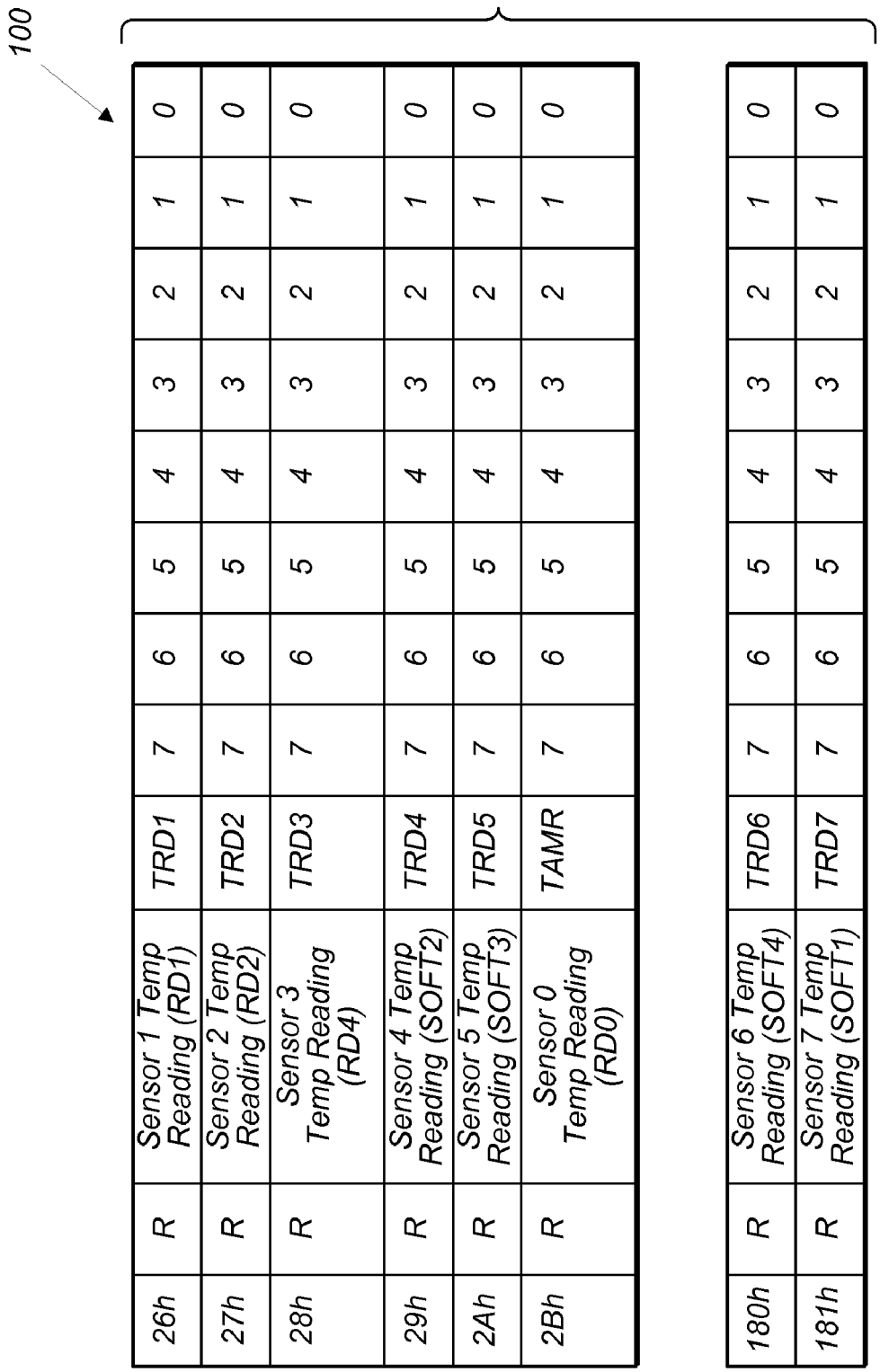
FIG. 1A is a prior art depiction of a virtual register map layout.

Turning now to FIG. 1A, an example prior art data sheet 100 containing a virtual register map is seen. In this example, logically similar virtual registers SOFT1 and SOFT4 are located, respectively, at memory addresses (or offsets) 0x181h and 0x180h. SOFT1 and SOFT4 are separated by hundreds of bytes from virtual registers SOFT2 and SOFT3 (located respectively at memory addresses or offsets 0x29h and 0x2Ah.) A programmer using this data sheet might have to manually transcribe the memory address of a virtual register to program code in order to access that virtual register. This manual entry process can lead to errors. The manual transcription problem is compounded by the fact that the opportunity exists for at least two different parties to make an error: the programmer coding software for use in an embedded controller, and the programmer coding host software for use by the customer of the embedded controller device. Furthermore, should the virtual register layout change or be expanded, the data sheet 100 must be manually updated, which is a tedious task and may result in a high degree of fragmentation of the virtual register map. Errors can also be introduced during the updating of the data sheet 100.

Turning to FIGS. 1B-1D, a definition of an example structure definition 110 for a fan control is depicted. This structure definition 110 is represented in C code 120 as the Fan_Control structure. An example overall virtual register map is represented by C code 130. C code 130 lays out one "Status" virtual register, eight "Sensor" virtual registers, and three "Fan_Control" virtual registers. Virtual register maps and structure definitions may be implemented differently than the above examples, either using the C programming language or using other different programming languages. For example, a virtual register need not be limited to one "struct" in C code. Virtual register maps and structure definitions are thus not limited to the above.

Given the C code of FIGS. 1C-1D, a pointer of type Virtual_Register_Map could be set to the base address of the virtual register region in memory (denoted by VREG_BASE_ADDR):

```
struct Virtual_Register_Map *vregs =
    (struct Virtual_Register_Map *) VREG_BASE_ADDR;
```

A reference to the Configuration field for Fan 2 would simply be:

X=vregs->Fan_Control[2].Configuration;

The offset of the virtual register does not need to be calculated by the programmer since a compiler can determine the address of the Configuration field from the structure definition. If 12 sensors are subsequently used instead of only 8, the program code reference to Fan_Control[2].Configuration can remain the same, even though the actual location previously denoted by the code is likely to be memory displaced by the space required for the four additional sensors.

In certain embodiments, each virtual register of an embedded controller will have an explicit offset from the base of the virtual register region in memory. The offset can be calculated by adding together the structure sizes of all the structures that appear before the virtual register in question, then adding the offset of the variable in question. For example, in the Fan_Control example cited above, if we assume the structure Status is 32 bytes, structure Sensor is 8 bytes, and structure Fan_Control is 16 bytes, then the offset for Fan_Control[2].Configuration is (32+8*8+2*16+4), or 132. If a new version of the software requires a different layout of virtual registers, the offset for Fan_Control[2].Configuration may change, but the logical reference to that value will remain vregs->Fan_Control[2].Configuration, so that software written in C or other high level language does not have to change.

Figure 2:
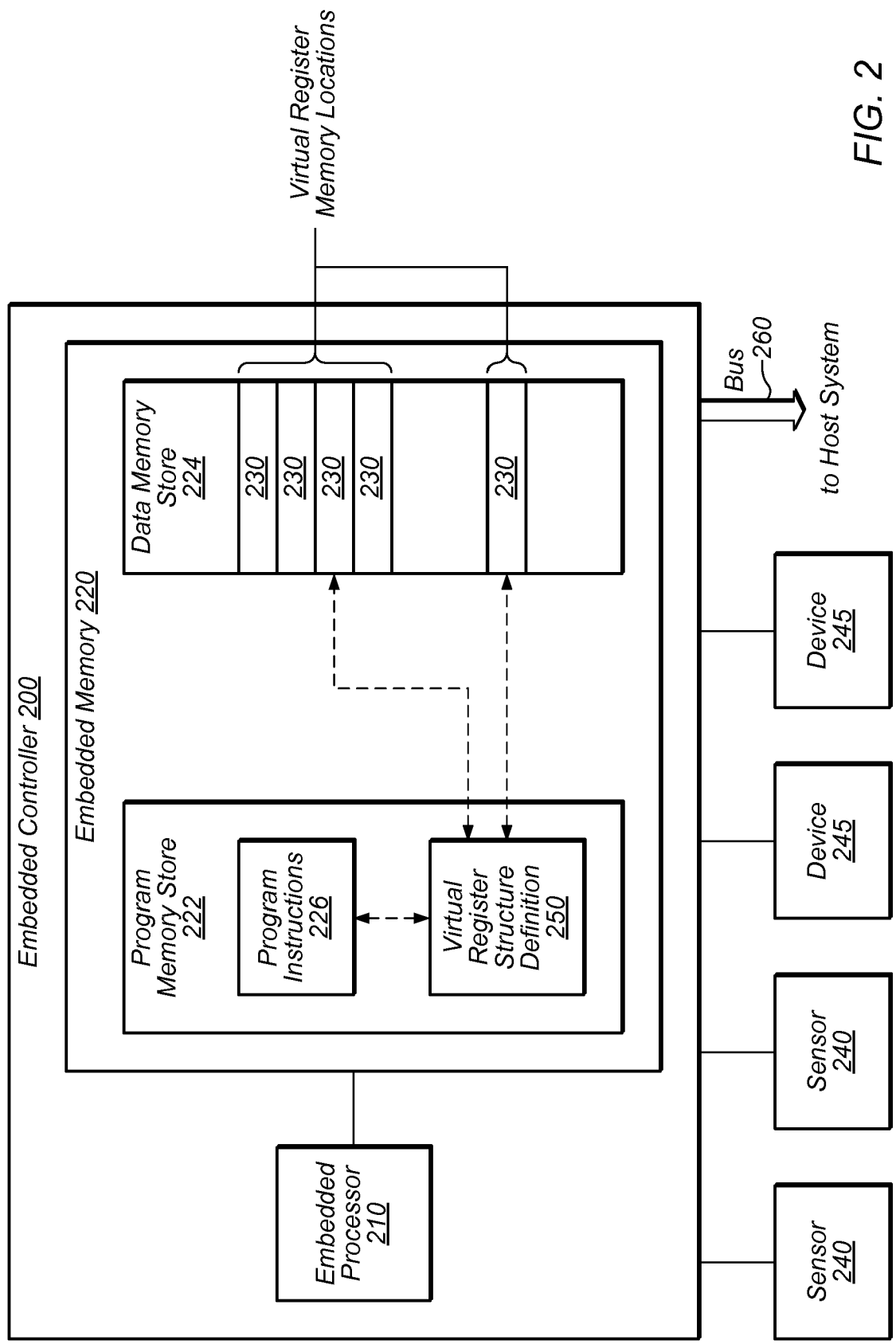
FIG. 2 is a block diagram of an embedded controller according to one embodiment.

Turning now to FIG. 2, a block diagram of an embedded controller 200 is depicted. As shown, embedded controller 200 includes an embedded processor 210 coupled to an embedded memory 220. Embedded processor 210 may have a singular processing unit but is not limited in this regard. Embedded processor 210 may have multiple cores and/or multiple processing units in some embodiments. Embedded memory 220 may be any feasible combination of memory technology capable of storing data, including, without limitation SDRAM, DDR SDRAM, RDRAM, SRAM, flash memory, EPROM, EEPROM, other various types of ROM, etc.), as well as storage media or memory media such as magnetic (e.g., disk) or optical media (e.g., CD, DVD, and related technologies, etc.). Embedded memory 220 may be either volatile or nonvolatile memory or some combination thereof. In some embodiments, the embedded controller 200 may also be coupled to a number of sensors 240, devices 245, and a bus 260.

The embedded memory 220 includes memory locations 230. Collectively, memory locations 230 represent (or implement) one or more virtual registers that are externally accessible. In some embodiments, memory locations 230 may be externally accessible to a host processor in a host system through a bus 260, such as a Low Pin Count (LPC) bus, or any other bus or interface. Bus 260 may be directly connected to a host system, or there may be other intermediate hardware devices and/or busses that allow memory locations 230 to be externally accessible. (See FIG. 4, discussed below.) External access to the virtual registers corresponding to memory locations 230 may be mediated by the embedded controller in some embodiments. For example, external access to the virtual registers corresponding to memory locations 230 may be delayed or denied to prevent a host system from externally modifying a critical resource. This mediation may be effected in some embodiments by the execution of instructions 226.

Embedded memory 220 may in some embodiments include a portion that is a data memory store 224, within which memory locations 230 are contained. Memory locations 230 are not limited to data memory store 224, however, and may be located anywhere within embedded memory 220. Memory locations 230 may be located in a contiguous range of memory addresses, or they may be located in two or more non-contiguous segments (i.e., leaving "holes" or spaces in the virtual register layout.) Thus, memory locations 230 representing one or more virtual registers define a "virtual communication region" between the embedded controller 200 and an external processor and/or system. Memory locations 230 may also be accessed using direct memory access (DMA).

Embedded memory 220 also stores program instructions 226. In some embodiments, embedded memory 220 includes a portion that is an embedded program memory store 222, within which program instructions 226 may be contained. Embedded memory 220 further stores a virtual register structure definition 250 which in some embodiments may be contained within the program memory store 222. In some embodiments, the virtual register structure definition 250 may be located external to program instructions 226, while in other embodiments, the virtual register structure definition may be located within the program instructions 226, or some combination thereof may exist. For example, if program instructions 226 were compiled from source code written in the C programming language, the virtual register structure definition 250 might be present within instructions 226 as references to particular memory addresses corresponding to memory locations 230. If program instructions 226 were based on the Java programming language, the virtual register structure definition 250 might be embodied as a separate object containing the virtual register layout. Virtual register structure definition 250 is not limited in these respects, however, and may be implemented differently in different embodiments.

The virtual register structure definition 250 may essentially contain a logical "map" of which locations 230 in memory 220 correspond to certain virtual registers. Program instructions 226 are executable by the embedded processor 210 to use the virtual register structure definition 250 to locate a particular address in embedded memory 220 that corresponds to a particular virtual register. Program instructions 226 are also executable to generate data and to store data in a particular virtual register at its corresponding memory location 230. Data to be stored in a virtual register may be acquired from any one or more of a plurality of sensors 240 or devices 245 that are coupled to embedded controller 200. Data that is generated data may also be acquired data.

In some embodiments the virtual register structure definition 250 may be modified to produce a second virtual register structure definition. This second structure definition may contain a different logical "map" of the memory locations 230 in embedded memory 220 that correspond to various virtual registers. For example, assume that virtual registers VR1 and VR2 are 16 bits wide and are located in the embedded memory 220 at the address spaces 0x00 to 0x0F and 0x10 to 0x1F, respectively. At a later time, the data stored in VR1 may need to be measured with greater precision, and VR1 will become a 32 bit wide virtual register. The second virtual register structure definition may reflect the new 32 bit wide VR1 as being present in the address space 0x00 to 0x1F, and show the logical location of VR2 as being moved to the address space 0x20 to 0x2F. Alternatively, the second virtual register structure definition might show VR2 in its original location (0x10 to 0x1F), and instead use 16 bits of address space located elsewhere in embedded memory 220 as the second portion of the now 32 bit wide VR1 (i.e., VR1 need not be contiguous.)

Embedded memory 220 is a computer readable memory medium. In one embodiment, program instructions 226 stored within the embedded memory are executable by the embedded processor 210 to use the virtual register structure definition 250 to store environmental monitoring data in one or more particular locations 230 within the embedded memory 220. The one or more particular locations 230 are accessible as virtual registers to a host processor or other external entity using the virtual register structure definition 250. The host processor need not use the structure definition stored within the embedded controller, however. The host processor may instead use a locally stored copy of the virtual register structure definition 250 (stored in the host memory), which will enable the host processor to properly access the memory locations 230 that correspond to one or more virtual registers of the embedded controller. In some embodiments, one or more virtual registers may correspond to two or more non-contiguous memory locations 230. In some embodiments, the host system may periodically receive an updated version of the virtual register structure definition 250 from the embedded system.

The program instructions 226 may also be executable by the embedded processor 210 to generate the environmental monitoring data prior to storing the data in the one or more particular memory locations 230. Environmental monitoring data may be generated and/or acquired using sensors 240 or devices 245 that are capable of monitoring or interacting with environmental conditions and that are coupled to embedded controller 200. Generation and acquisition of environmental monitoring data is not limited in this respect, however. Also, the program instructions 226 are not limited to generating and/or acquiring environmental data. Any type of data may be generated or acquired prior to storing the data in the one or more particular memory locations 230. This data may include, for example, debugging data, network traffic monitoring data, health monitoring data, power monitoring data, system error codes, or other types of data.

Figure 3:
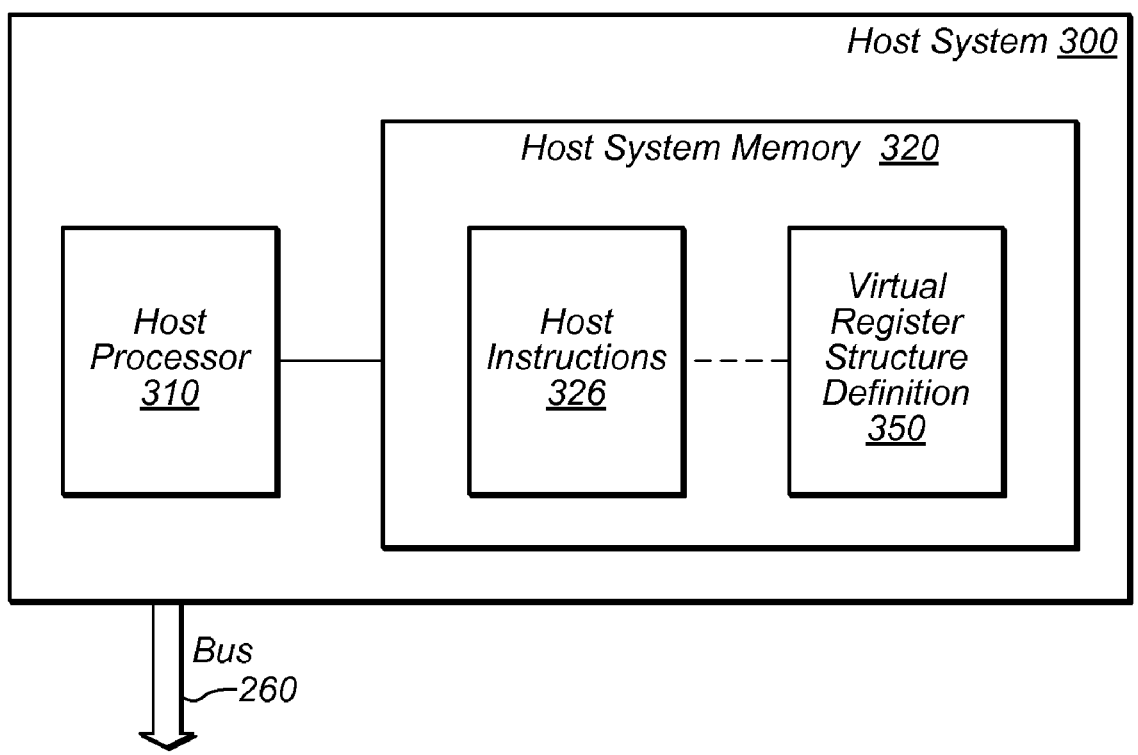
FIG. 3 is a block diagram of a host system according to another embodiment.

FIG. 3 illustrates an exemplary host system 300. Host system 300 includes a host processor 310 and a host memory 320, which is a computer readable memory medium. Host memory 320 may be any feasible combination of memory technology capable of storing data that would occur to those with skill in the art of embedded systems, including, without limitation SDRAM, DDR SDRAM, RDRAM, SRAM, flash memory, EPROM, EEPROM, other various types of ROM, etc.), as well as storage media or memory media such as magnetic (e.g., disk) or optical media (e.g., CD, DVD, and related technologies, etc.). Host memory 320 may be either volatile or nonvolatile memory or some combination thereof.

Stored within host memory 320 are host instructions 326 and a virtual register structure definition 350. In some embodiments, virtual register structure definition 350 is an exact copy of the virtual register structure definition 250 stored within the embedded memory of the embedded controller. In other embodiments, virtual register structure definition 350 may substantially correspond to the virtual register structure definition 250 such that structure definition 350 is usable to determine some (if not all) of the memory locations present in an embedded controller that are externally accessible as virtual registers. In other words, in some embodiments the virtual register structure definition 350 comprises only a subset of the information contained in the virtual register structure definition 250. The virtual register structure definition 350 may be located external to program instructions 326, while in other embodiments, virtual register structure definition 350 may be located within instructions 326. Some combination thereof may also exist.

Host instructions 326 are executable by the host processor 310 to use the virtual register structure definition 350 to determine one or more memory addresses within the embedded memory of an embedded controller. Host instructions 326 are executable to read data from or store data in one or more virtual registers corresponding to memory locations of the embedded memory of the embedded controller. In some embodiments, host instructions 326 are executable to read data or store data using direct memory access. However, the host instructions are not limited in this respect, and may access data in memory locations 230 using any techniques that may occur to those with skill in the art.

Figure 4:
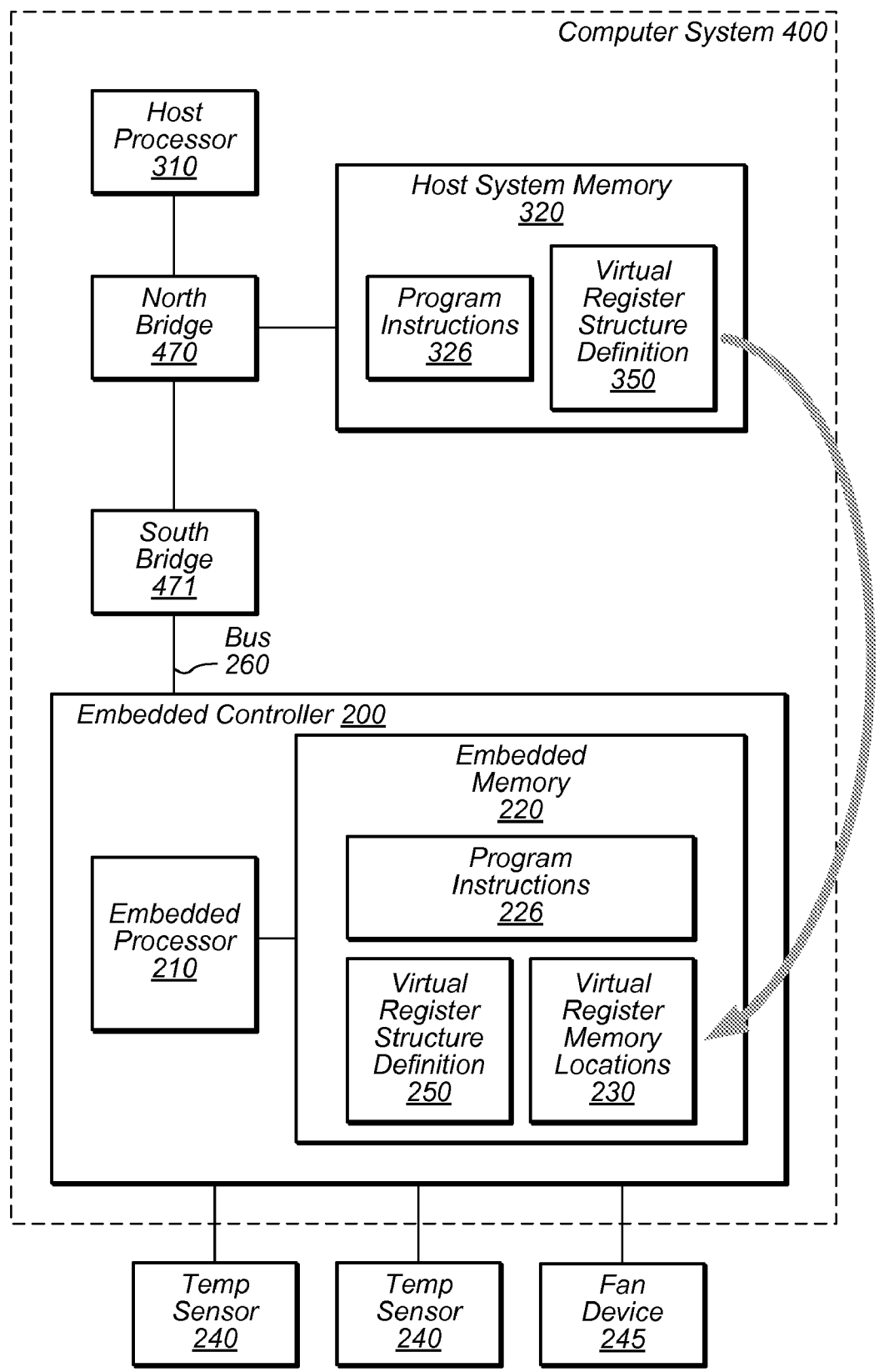
FIG. 4 is a block diagram of a computer system according to yet another embodiment.

Turning now to FIG. 4, a computer system embodiment 400 comprising an embedded controller 200, a host processor 310, a host system memory 320, a north bridge hub 470, and a south bridge hub 471 is shown. Note that except where otherwise indicated, the functionality of structures in FIG. 4 is substantially similar to the functionality described above with reference to those same structures in regard to FIGS. 2 and 3.

In computer system 400, an embedded controller 200 is coupled to a bus 260, which may be a low pin count bus in some embodiments. Bus 260 connects controller 200 to the host processor 310 and the host system memory 320 via a south bridge hub 471 and a north bridge hub 470. Temperature sensors 240 and a fan device 245 are coupled to embedded controller 200. The embedded controller is not limited in this respect, however, and may have any number of sensors 240 or devices 245 coupled to it. In some embodiments, north bridge 470 and south bridge 471 may be omitted, or may be replaced with other structures that allow embedded controller 200 to be connected to host processor 310 and host memory 320.

In the embodiment pictured in FIG. 4, program instructions 226 stored within the embedded memory 220 are executable by the embedded processor 210 to acquire data from sensors 240 or devices 245. In some embodiments, sensors 240 may be temperature sensors and devices 245 may be fan devices. Program instructions 226 are also executable by the embedded processor to store that acquired data, using virtual register structure definition 250, in one or more memory locations 230 that correspond to one or more virtual registers of the embedded controller 200. As in other embodiments, memory locations 230 are externally accessible from outside the embedded controller 200. In the embodiment pictured in FIG. 4, instructions 326 stored within the host system memory 320 are executable by the host processor 310 to use virtual register structure definition 350 to read data from and write data to the virtual registers corresponding to one or more of memory locations 230. Note that structure definition 350 may be an exact copy of structure definition 250, or it may substantially correspond to structure definition 250 such that structure definition 350 is usable to determine some (if not all) of the memory locations present in the embedded controller that are externally accessible as virtual registers.

Program instructions 226 may also, in some embodiments, be executed by embedded processor 210 to selectively prevent or delay modification of the contents of one or more of the plurality of memory locations 230. This may be done, for example, to prevent or delay modification of a critical resource.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A system comprising:
an embedded processor;
an embedded memory coupled to the embedded processor, wherein the embedded memory has a plurality of memory locations;
wherein the embedded memory stores a first virtual register structure definition useable by the embedded processor to store data at one or more first portions of the plurality of memory locations;
wherein the one or more first portions of the plurality of memory locations are externally accessible as a plurality of virtual registers to a host processor using the first virtual register structure definition;
wherein the first virtual register structure definition is operable to be modified to produce a second virtual register structure definition that is useable by the embedded processor to store data at one or more second portions of the plurality of memory locations; and
wherein the one or more second portions of the plurality of memory locations are externally accessible as a plurality of virtual registers to a host processor using the second virtual register structure definition.

2. The system of claim 1, wherein the embedded memory comprises:
a data memory store, wherein the data memory store contains the plurality of memory locations; and
a program memory store, wherein the program memory store contains instructions executable by the embedded processor to generate the data.

3. The system of claim 1,
wherein the first and second virtual register structure definitions, when used as part of an executable program, will result in a same memory mapping for the first portions of the plurality of memory locations.

4. The system of claim 1, further comprising:
a plurality of sensors and/or a plurality of devices coupled to the embedded memory and operable to acquire the data.

5. A non-transitory computer readable memory medium comprising a plurality of memory locations, wherein the computer readable memory medium stores:
at least one virtual register structure definition; and
program instructions executable by an embedded processor and operable with the at least one virtual register structure definition to store environmental monitoring data in one or more particular locations of the plurality of memory locations;
wherein the one or more particular locations of the plurality of memory locations are externally accessible as a plurality of virtual registers to a host processor using the at least one virtual register structure definition;
wherein the at least one virtual register structure definition is modifiable to produce at least a second virtual register structure definition, wherein additional program instructions are executable to cause the embedded processor to store environmental monitoring data at one or more additional locations of the plurality of memory locations; and
wherein the one or more additional locations of the plurality memory locations are externally accessible as a plurality of virtual registers to the host processor using the at least a second virtual register structure definition.

6. The non-transitory computer readable memory medium of claim 5, wherein the program instructions are executable by the embedded processor to generate the environmental monitoring data prior to storing the data in the one or more particular locations of the plurality of embedded memory locations.

7. A system, comprising:
a host processor coupled to a host memory;
wherein the host memory contains:
at least one virtual register structure definition; and
instructions executable by the host processor and operable with the at least one virtual register structure definition to read data from one or more virtual registers of an embedded controller;
wherein for each one of the virtual registers, the at least one virtual register structure definition is usable by the host processor to determine a corresponding memory address of a particular memory location for that virtual register of the embedded controller;
wherein the at least one virtual register structure definition is operable to be modified to produce at least one expanded virtual register structure definition that is useable by the host processor to read data from one or more additional virtual registers of the embedded controller; and
wherein for each of the one or more additional virtual registers, the at least one expanded virtual register structure definition is usable by the host processor to determine a corresponding memory address of a particular memory location for that additional virtual register.

8. The system of claim 7,
wherein the instructions are executable to read data from the one or more virtual registers of the embedded controller using direct memory access.

9. The host computer system of claim 8,
wherein the instructions are executable to store data in the one or more virtual registers of the embedded controller using direct memory access.

10. A non-transitory computer readable memory medium storing:
a virtual register structure definition that contains information indicating one or more particular memory locations within an embedded controller that correspond to a plurality of virtual registers of the embedded controller; and
program instructions executable by a host processor and operable with the virtual register structure definition to read data from the plurality of virtual registers of the embedded controller;
wherein the virtual register structure definition is operable to be modified to produce a second virtual register structure definition that contains information indicating one or more additional memory locations within the embedded controller that correspond to an additional plurality of virtual registers of the embedded controller;
wherein the second virtual register structure definition is useable by the host processor to read data from the additional plurality of virtual registers of the embedded controller.

11. The non-transitory computer readable memory medium of claim 10, wherein the instructions are executable by the host processor to store data in the plurality of virtual registers of the embedded controller; and
wherein the instructions are executable by the host processor to read data from and store data in the plurality of virtual registers using direct memory access.

12. A computer system, comprising:
a host processor coupled to a host memory; and
an embedded controller comprising an embedded processor coupled to an embedded memory;
wherein the host memory and the embedded memory each contain at least one virtual register structure definition;
wherein the host memory contains host instructions executable by the host processor and operable with the at least one virtual register structure definition contained in the host memory to read data from a plurality of virtual registers corresponding to one or more locations in the embedded memory of the embedded controller;
wherein the at least one virtual register structure definition is operable to be modified to produce at least a second virtual register structure definition that contains information indicating one or more additional locations in the embedded memory of the embedded controller that correspond to an additional one or more virtual registers of the embedded controller;
wherein the at least a second virtual register structure definition is useable by the host processor to read data from the additional one or more virtual registers of the embedded controller.

13. The system of claim 12, further comprising:
a plurality of temperature sensors coupled to the embedded controller;
wherein the embedded memory contains embedded instructions executable by the embedded processor and operable with the at least one virtual register structure definition contained in the embedded memory to acquire data from the plurality of temperature sensors and store the acquired data in one or more of the plurality of virtual registers.

14. The system of claim 12, wherein the host instructions are executable by the host processor to attempt to store data in the plurality of virtual registers; and
wherein the embedded memory contains embedded instructions executable by the embedded processor to selectively prevent modification of the contents of one or more of the plurality of virtual registers.

* * * * *